(12) United States Patent
Drooger et al.

(10) Patent No.: US 10,992,670 B1
(45) Date of Patent: Apr. 27, 2021

(54) AUTHENTICATING IDENTITIES FOR ESTABLISHING SECURE NETWORK TUNNELS

(71) Applicant: Amazon Technologies, Inc., Seattle, WA (US)

(72) Inventors: Jack A. Drooger, Seattle, WA (US); Galen Caldwell, Seattle, WA (US); Jonathan Carl Lundstrom, Seattle, WA (US); Ken Chu, Seattle, WA (US); Jaimin Bhatt, Seattle, WA (US); Frank Johnston, Seattle, WA (US); Ali Kourosh Gharib, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 16/186,740

(22) Filed: Nov. 12, 2018

(51) Int. Cl.
*H04L 29/06* (2006.01)
*H04L 9/32* (2006.01)
*H04L 12/46* (2006.01)

(52) U.S. Cl.
CPC ........ *H04L 63/0876* (2013.01); *H04L 9/3271* (2013.01); *H04L 12/4633* (2013.01); *H04L 12/4641* (2013.01); *H04L 63/0428* (2013.01); *H04L 63/105* (2013.01); *H04L 63/20* (2013.01); *H04L 2463/082* (2013.01)

(58) Field of Classification Search
CPC ............. H04L 63/0876; H04L 63/0428; H04L 12/4633; H04L 63/105; H04L 9/3271; H04L 12/4641; H04L 63/20; H04L 2463/082
See application file for complete search history.

(56) References Cited

U.S. PATENT DOCUMENTS

| 9,467,475 | B2 * | 10/2016 | Faltyn | H04L 63/20 |
| 9,729,539 | B1 * | 8/2017 | Agrawal | H04L 63/0815 |
| 10,075,437 | B1 * | 9/2018 | Costigan | H04L 9/3271 |
| 2004/0107360 | A1 * | 6/2004 | Herrmann | H04L 63/08 726/1 |

(Continued)

OTHER PUBLICATIONS

Reimair et al., "Emulating U2F authenticator devices", 2016, IEEE Workshop on Security and Privacy in the Cloud, pp. 1-9. (Year: 2016).*

*Primary Examiner* — Matthew Smithers
(74) *Attorney, Agent, or Firm* — Lee & Hayes, P.C.

(57) ABSTRACT

This disclosure describes techniques for utilizing strong authentication of device identities and/or user identities to establish secure network tunnels between client devices and a virtual private network (VPN) server of a service provider network. The service provider network may generate routes from the VPN server to services to establish a connection for the client device to access the services. The service provider network may receive posture data from the client device that indicates a state of the client device, and determine, using a security policy, with which services the client device is permitted to interact or utilize. Further, the techniques described herein include receiving requests from the services to provide cryptographic assertion(s) that were used by the VPN server to authenticate the device identities and/or user identities. In this way, the services may be able to perform strong authentication of the client devices that are attempting to utilize the services.

21 Claims, 9 Drawing Sheets

(56) References Cited

U.S. PATENT DOCUMENTS

| | | | |
|---|---|---|---|
| 2006/0031936 A1* | 2/2006 | Nelson | H04L 9/0891 |
| | | | 726/23 |
| 2008/0232382 A1* | 9/2008 | Iwama | H04L 12/4641 |
| | | | 370/401 |
| 2009/0046591 A1* | 2/2009 | Krishnaswamy | H04L 63/029 |
| | | | 370/252 |
| 2011/0173678 A1* | 7/2011 | Kaippallimalil | H04L 63/162 |
| | | | 726/4 |
| 2013/0133043 A1* | 5/2013 | Barkie | H04L 63/0485 |
| | | | 726/4 |
| 2013/0250947 A1* | 9/2013 | Zheng | H04L 45/02 |
| | | | 370/389 |
| 2014/0208095 A1* | 7/2014 | Stuntebeck | H04L 63/105 |
| | | | 713/152 |
| 2016/0134620 A1* | 5/2016 | Morrison | H04W 4/023 |
| | | | 726/6 |
| 2017/0346856 A1* | 11/2017 | Newell | H04L 63/0281 |
| 2018/0254909 A1* | 9/2018 | Hancock | H04L 9/3213 |
| 2019/0124081 A1* | 4/2019 | Nowak | H04L 63/0892 |
| 2020/0067922 A1* | 2/2020 | Avetisov | H04L 9/3234 |
| 2020/0127858 A1* | 4/2020 | Stohr | H04L 63/0807 |

* cited by examiner

AUTHENTICATING IDENTITIES FOR ESTABLISHING SECURE NETWORK TUNNELS

BACKGROUND

Service provider networks offer network-based services to fulfill users' computing-service needs without the users having to invest in and maintain computing infrastructure required to implement the services. To access these services provided by the service provider networks, users often utilize unsecure public networks, such as the Internet, that are vulnerable to attack (e.g., phishing, data breaches, etc.). While some types of services may involve the communication non-sensitive information, such as an online gaming service, various services may involve the communication of sensitive information, such as email services, financial services, and so forth. Malicious users may attempt to fraudulently obtain the sensitive information that is communicated over these unsecure networks. For instance, malicious users may perform phishing or spoofing attacks where users are directed to fake websites operated by the malicious users, but that have the same look and feel as legitimate websites provided by the services. At these fake websites, the users are asked to enter their sensitive information as if they were interacting with websites provided by the services, such as usernames, passwords, credit card information, and so forth. In this way, the malicious entities may fraudulently obtain user log in credentials, such as usernames and passwords, to access the services of the users and perform malicious acts (e.g., transfer funds, obtain additional sensitive or private information, etc.).

To prevent malicious entities from accessing services using fraudulently obtained user credentials, the services of the service provider network may also attempt to perform device authentication for client devices to help ensure that the client device attempting to log in for use of the services is a known or trusted client device of the user. However, the device identifiers may similarly be phished or spoofed by malicious users in order to misrepresent the fraudulent devices as the trusted client devices of the users. Additionally, various client devices and/or services may not support protocols or other means for establishing device identity.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
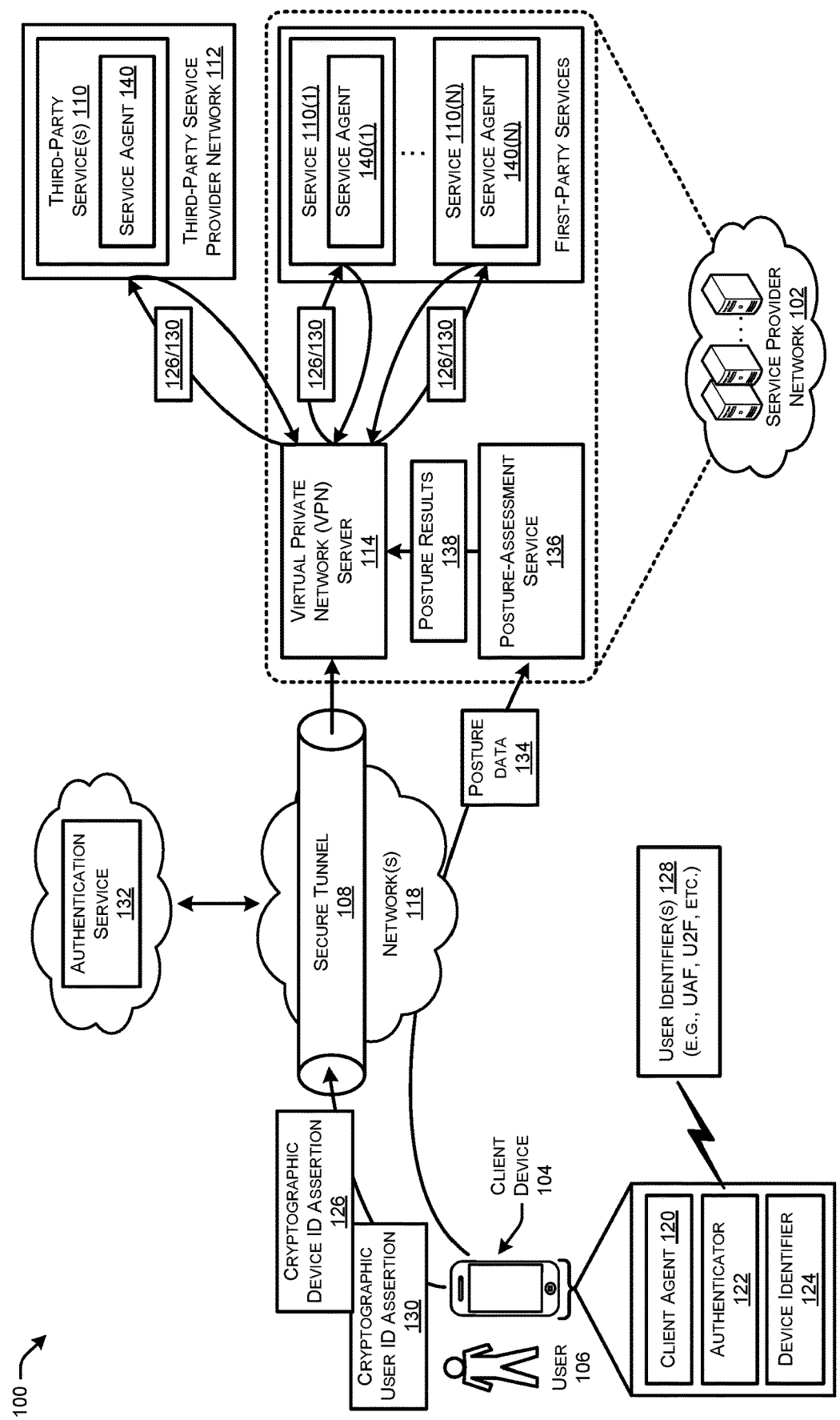
FIG. 1 illustrates a system-architecture diagram of an example environment in which a service provider network authenticates a device identity and a user identity for a client device to establish a secure tunnel for the client device to access services.

This disclosure describes, at least in part, techniques for utilizing strong authentication of device identities and/or user identities to establish secure (or cryptographic) network tunnels between client devices and a virtual private network (VPN) server of a service provider network, and generating one or more routes from the VPN server to services provided by the service provider network to establish a connection between the client device and the services. In some examples, the techniques further include receiving posture data from the client device that indicates a state of the client device. The service provider network may determine, using a security policy, the services with which the client device is allowed to, or restricted from, interacting. For example, if the posture data indicates that the client device has an operating system patch installed that is not current, the client device may not be permitted to establish the secure tunnel and/or may not have a route generated from the VPN server to one or more of the services. Further, the techniques described herein include receiving calls or requests from the services at the VPN server to provide cryptographic assertion(s) that were used by the VPN server to authenticate the device identities and/or user identities before establishing the secure tunnel. In this way, the services may further be able to perform strong authentication of the client devices that are attempting to utilize the services.

Traditionally, services provided by a service provider network, and/or by third-parties associated with the service provider network, may utilize relatively weak device identifiers and/or user identifiers, and/or may not be capable of performing device and/or user authentication at all. For example, in addition to requiring a username and password, email services may be configured to use device identifiers, such as plaintext strings, as a way to authenticate the client devices that are attempting to log in to an account of the email service. In this way, even if a particular device has the appropriate username and password, the client device may further need to authenticate its device identity to the email service by providing a plaintext string that identifies the device as previously being associated with the username and password. In this way, the email service may prevent client devices that may have the correct username and password from accessing an account of the email service if the received device identifier does not correspond to an authorized client device. However, similar to how a username and password may be phished or otherwise maliciously obtained, the plaintext weak identifiers may be obtained and used by a fraudulent device to spoof or otherwise imitate an authorized device to gain access to an email service. Thus, weak device identifiers may suffer from various security vulnerabilities, and some client devices and/or services may not even be capable to perform various protocols for implementing a device identity authentication.

The techniques described herein contemplate the use of a VPN server placed as an intermediary, or middle-man, between client devices and services that are managed by a service provider network. The VPN server, and/or other devices managed by the service provider network, may be configured to utilize various cryptographic protocols for performing strong device authentication and/or strong user identification. The VPN server may utilize the cryptographic protocols to establish a secure tunnel with the client device such that all backend services of the service provider network are provided with the same high level of security provided by the strong authentication regardless of how sophisticated or secure the services are individually. Even further, the service provider network may receive posture data from the client device indicating a state of the client device, such as whether the client device is in a bad or unhealthy state and is vulnerable to attack due to expired patches, vulnerable applications, and so forth, or if the client device is in a good or healthy state in that the client device is not vulnerable to attack. The service provider network may evaluate the posture data against a set of security policies and determine, for individual services, whether the client device is permitted or restricted from accessing the services. The service provider network may then generate routes between the VPN server and the services for which the client device is allowed to access based on the posture data.

In some examples, to establish a secure tunnel as described herein, the client device and the VPN server may utilize a credential-management service that enables strong authentication using cryptography, such as public key cryptography. In this way, the VPN server may enable authentication and/or secure second-factor authentication in a seamless way for users. For instance, the client device and VPN server may be configured to utilize a Web Authentication API (or WebAuthn), or another authentication service, that utilizes asymmetric (public-key) cryptography for registering, authenticating, and performing second-factor authentication to establish a secure tunnel between the client device and the VPN server. For example, WebAuthn may be utilized to enable the creation strong, public key-based credentials that are utilized by the VPN server to authenticate device identities of client devices, and/or user identities of the users of the client devices.

In some examples, once the client device has registered for an account with the VPN server using the WebAuthn protocol, the client device may send a request to the VPN server to access a service provided by the service provider network. For instance, the client device may navigate to a web page for an email service to log in to their email account. Rather than simply relying on the username and password to allow the client device access to their email account provided by the email service, the VPN server may first send a challenge for the client device to authenticate the device identity of the client device as being tied to the account. The client device may receive the challenge, and utilize a device identity authenticator to respond to the challenge. For example, the client device may utilize a silent authenticator, such as an Operating System (OS) native identifier that is built into the device during manufacturing. Using the silent authenticator, the authenticator may verify that the client device is authenticated and utilize a private key to create a cryptographic signature, or a cryptographic assertion, to respond to the server to indicate that the device identity is authentic. The VPN server may then receive the cryptographic signature and utilize a public key provided by WebAuthn to verify that the client device is authentic. In this way, the VPN server may perform strong device authorization to determine whether the client device that is attempting to utilize a service is an authentic client device associated with the account of the service. In some examples, the VPN server may then establish a secure tunnel with the client device upon authenticating the device identity of the client device. In some examples, strong authentication may be a method of verify the identity of the device and/or user that is intrinsically stringent enough to ensure the security of the system it protects by withstanding attacks it is likely to encounter, and may include the use of a cryptographic protocol or process.

However, in some examples the VPN server may perform a step-up authentication, or a second-factor authentication, to further verify that an authorized user is attempting to access the service. For instance, rather than allowing a verified, authentic client device access to a service, the VPN server may further verify a user identity of a user of the client device before establishing the secure tunnel with the client device. Thus, the VPN server may send another challenge to the client device to verify the user identity of the user as being registered with the account. To verify the user identity, the client device may utilize a user identity authenticator. For instance, the client device may utilize a universal $2^{nd}$ factor (U2F) to authenticate a user, such as by using a specialized Universal Serial Bus (USB) or near-field communication (NFC) device that is registered for the particular user. Additionally, or alternatively, the client device may authenticate the user identity using a universal authentication framework (UAF) protocol, such as scanning a user's fingerprint using a fingerprint scanner, having the user speak into a microphone, having the user enter a PIN, and/or other UAF protocols. In this way, the user identity authenticator may verify that the client device is being operated by an authorized user based on proving the user identity, and utilize the private key to create another cryptographic assertion to respond to the server's challenge to indicate that the user identity is authentic. The VPN server may then receive the cryptographic assertion and utilize the public key provided by WebAuthn to verify that the user identity as being associated with the user account. In this way, the VPN server may perform strong user identity authorization to determine whether the client device that is attempting to utilize a service is operated by an authentic user. In some examples, the VPN server may then establish a secure tunnel with the client device upon authenticating the device identity of the client device, and the user identity of the user of the client device.

In various examples, the client device may further have a client agent running thereon that is configured to continuously, or periodically, collect posture data. Generally, the posture data may comprise any type of data indicating whether the client device is in a good or healthy state, or a bad or unhealthy state. For instance, the posture data may indicate state events on the device, such as whether OS updates/patches are installed, whether applications have gone past a vulnerability window, whether the user of the device has logged-in using an appropriate domain user or a bypass-workaround, and/or other data indicative of a healthy state of the client device. Prior to attempting to establish the secure tunnel with the VPN server, the client agent may perform posture assessment to determine whether the client device is in a healthy state to connect to the VPN server. If the client agent determines that the client device is in a healthy state, the client agent may allow the client device to initiate the process for establishing the secure tunnel with the VPN server.

Additionally, the client device may continuously, or periodically, provide the posture data to the service provider network. The service provider network may include a posture-assessment service configured to determine whether the posture data violates a security policy for establishing a secure tunnel, and/or for routing the communications to particular services. The posture-assessment service may receive the posture data, and evaluate the posture data against security policies to determine a posture level or the client device. Depending on the posture level, the VPN server may generate a set of routes from the VPN server to services with which the client device is authorized to communicate, and/or refrain from generating routes to particular services with which the client device is restricted from communicating. For instance, the services may require different posture levels depending on the level of security needed to access the services. The service provider network may then continue to receive, or poll for, updated posture data from the client device. The posture data is reevaluated against the security policy, and routes to services may be added, removed, or otherwise modified depending on the updated posture data. In this way, routes between the VPN server and backend services of the service provider network may be monitored based on evaluating posture data of a client device against security policies for the services. In some examples, the posture data may further be analyzed to determine whether or not to establish the secure tunnel between the VPN server and the client device. For instance, a security policy may be defined such that, if the posture data violates the security policy, the client device may be in a bad state and the VPN server may refrain from establishing the secure tunnel. Similarly, the VPN server may terminate a secure tunnel if the posture data of the client device indicates that the client device has moved into a bad state.

Once the VPN sever has established the secure tunnel with the client device, the VPN server may provide the cryptographic assertions to the services that are communicating with the client device. For instance, the services may call the VPN server, such as by using an API call, to request the cryptographic assertions to verify the device identity of the client device and/or the user device. In this way, the backend services of the service provider network may also utilize the cryptographic assertions to perform strong device authentication and/or user identification. Once the secure tunnel is created and the routes are generated to the permitted services, the client device may utilize the services by communicating data through a connection formed by the secure tunnel and the routes from the VPN server to the services.

The techniques described herein may improve the security of communications performed between client devices and services in various ways. For instance, rather than utilizing traditional username and password credentials, and/or weak device identifiers such as plaintext strings, that may be phished and spoofed, the techniques described herein contemplate the user of strong identifiers, such as system-level device identifiers including native OS identifiers, that can be validated back to a root of trust. In this way, the client devices are authenticated using device identifiers that are native to the client device, such as being stored or burned into the client device during manufacturing, prior to establishing a secure connection. Additionally, the techniques may improve the security of communications by verifying or authenticating a user identity of a user of the client device. For instance, the user may be prompted to verify their identity using various biometric means, such as facial recognition (e.g., Windows Hello, FaceID, etc.), fingerprint identification (e.g., TouchID, Fingerprint API, etc.), user PIN input, etc. In this way, the VPN server may be able to validate that a user of the client device is an authorized user. Additionally, the techniques described herein may reduce the amount of user interaction required compared to remembering and inputting a username and password. For example, the user may not have to perform any interaction when the VPN server authenticates the device identity of the client device. Further, the user may need only look at a camera, swipe their finger, input a numeric PIN, swipe a NFC device by the client device, and/or provide other simple input to verify the user identity.

Although the use of WebAuthn is described herein, any type of cryptographic protocol may be utilized that supports the types of cryptographic device identity assertions and/or cryptographic user identity assertions described herein. Further, while the services are described as being managed by a service provider network, in some examples, the services may be managed by other parties that communicate with the VPN server that is managed by the service provider network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 authenticates a device identity for a client device 104, and a user identity user 106, to establish a secure tunnel 108 for the client device 104 to access various services 110.

In some examples, the service provider network 102 may comprise clusters of managed servers stored in data centers located across geographic areas. The service provider network 102 may be a distributed network through which users 106 (often customers) may interact via user devices 108 to utilize services 110. In some examples, the services 110 may be first-party services 110 included in, managed by, provided by, or otherwise associated with the service provider network 102. The services 110 may comprise any type of service 110 provided to a user 106, such as an email service 110, a video conferencing service 110, a financial service 110, and/or various computing resource services 110. For example, the service provider network 102 may provide computing resources for use by the user 106 on a permanent, or as-needed basis. The services 110 may include cloud-computing services 110, cloud-storage services 110, database-management services 110, network-resource services 110, and so forth. Additionally, the services 110 may include third-party services 110 that are provided by a third-party service provider network 112. The third-party service provider network 112 may be managed by, or operated by, a different entity than the service provider network 102, but receive some of the management functions of the service provider network 102.

Generally, a user 106 may register for an account to use a service 110 provided by the service provider network 102 using their client device 104. For example, the user 106 may register for an account to use an email service 110 provided by the service provider network 102 to send and receive electronic emails with other users 106. When creating the account to use a service 110, the user 106 may create a username and password, or other credentials, to later authorize themselves as the owner of the account and log in to utilize their service 110. Additionally, during registration, the client device 104 may provide a further form of device identification that may be used for authenticating the client device 104 when the user 106 tries to log into their account later to use the service 110. For example, the client device 104 may provide a plaintext string that corresponds to the client device 104. The service 110 may store an indication of the plaintext string and later, when the client device 104 attempts to log in to the account, the service 110 may request the plaintext string to determine whether or not the client device 104 is logging in, or a new device that the service 110 has not seen. In this way, the service may determine that, although the username and password may be correct, a fraudulent device might have phished the username and password and be spoofing the user 106 by attempting to access the service 110. Thus, the service 110 may not allow a device to access the account of the user 106 unless the device identifier is provided.

While usernames, passwords, and device identifiers may be difficult to have to guess by a malicious user, various problems exist with usernames and passwords. For instance, usernames and passwords are susceptible to attack using phishing schemes where a malicious user may direct the user 106 to a fake website operated by the malicious user, but that has the same look and feel as legitimate websites provided by the service 110. At these fake websites, the user 110 may be asked to enter their sensitive information as if they were interacting with websites provided by the service 110, such as the usernames, passwords, credit card information, and so forth. In this way, the malicious entities may fraudulently obtain user log in credentials, such as usernames and passwords, to access the service 110 of the user 106 and perform malicious acts (e.g., transfer funds, obtain additional sensitive or private information, etc.).

According to the techniques described herein, when the user 106 registers for an account with the service provider network 102, and/or during registration for use of a service 110, the client device 104 may interact with a virtual private network (VPN) server 114 of the service provider network 102 to establish the secure tunnel 108. Generally, the secure tunnel 108 may comprise a network connection that is created using a tunneling protocol that allows for movement of data from the client device 104 to the VPN server 114 across one or more networks 116. In some examples, the network(s) 116 may include at least one public network, such as the Internet. The secure tunnel 108 may allow for data to be securely or privately communicated across the network(s) 116 through a process called encapsulation. For instance, the data may be repackaged using an encryption standard, such as public key cryptography, such that data is encrypted at the client device 104 before being sent to the VPN server 114, and decrypted at the VPN server 114. In this way, the data is "hidden" using cryptographic means between the client device 104 and VPN server 114 to protect the data being communicated from attack. In some instances, during the registration process, the client device 104 and VPN server 114 may initialize the use of a cryptographic protocol, or tunneling protocol, for future communications. Any type of tunneling protocol may be utilized to create the encrypted tunnel, such as Secure Socket Tunneling Protocol (SSTP), Internet Protocol Security (IPSec), IPv4/IPv6 (IPIP), OpenVPN, and so forth. However, in some examples the techniques described herein may utilize the Web Authentication Protocol or API (or "WebAuthn") to create the secure tunnel.

Figure 2:
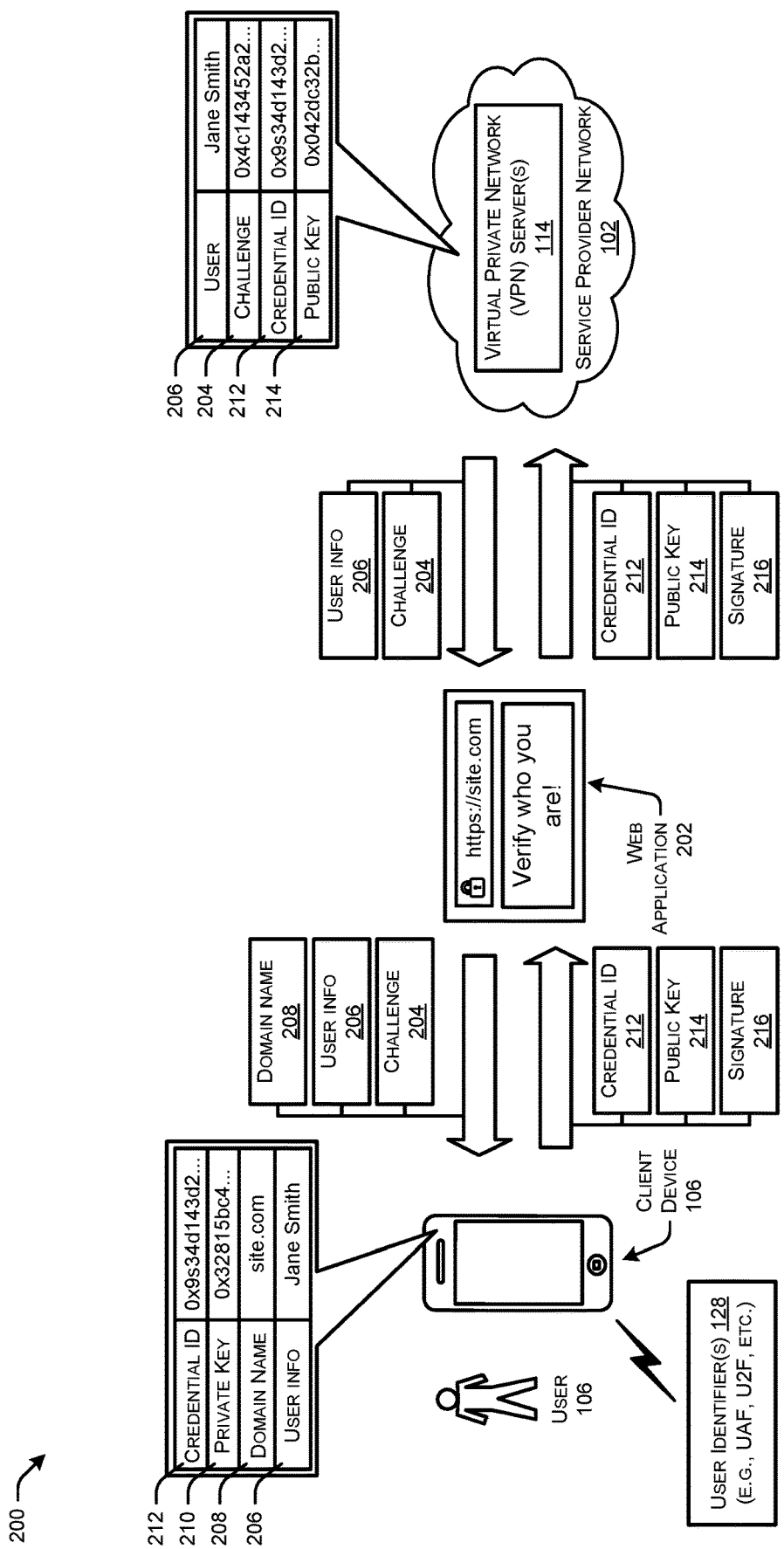
FIG. 2 illustrates an example environment in which a service provider network uses a cryptographic protocol to authenticate a device identity of a client device, and/or a user identity of a user.

As described in more detail in FIG. 2, using WebAuthn, the client device 104 may be provided with a private key, and the VPN server 114 may be provided with a public key for the account generated by the user 106. In this way, the client device 104 may encrypt data using the private key, and communicate the encrypted data to the VPN server 114 such that the VPN server 114 may decrypt the data for analysis. In some examples, the services 110 may additionally be provided with the public key and indication of the user's 106 account. Thus, during registration the client device 104 and VPN server 114 may agree to an encryption scheme or protocol by which to communicate using the secure tunnel 108.

After registration, the user 106 may wish to access their account with the service provider network 102 and/or with one of the specific services 110. For example, the user 106 may navigate to a website provided by the service provider network 102 and/or a service 110 to log in to utilize the service 110. The user 106 may enter their username and password, but prior to being allowed access to the service 110, the VPN server 114 may attempt to establish the secure tunnel 108 using the agreed upon cryptographic protocol, such as WebAuthn. The VPN server may begin by performing a strong device identity authentication by sending a challenge to the client device to verify the device identity. In some examples, the device identity may be verified using a silent authenticator that does not require user 106 input, such as by authenticating a unique and secure device identifier. The client device 104 may include a client agent 120, an authenticator 122, and an internal device identifier 124. As described further in FIG. 2, the authenticator 122 may perform operations for authenticating the device identifier 124 of the client device 104 in response to the challenge from the VPN server 114. The authenticator 122 may authenticate the device identifier 124, which may comprise any device identifier 124 with a chain of trust, such as an OS native identifier for the client device 104. After authenticating the client device 104 may use the private key and the device identifier 124 to generate a response to the challenge, such as a cryptographic device ID assertion 126 signed by the private key, indicating that the client device 104 includes the authentic and trusted device identifier 124. The VPN server 114 may receive the cryptographic device ID assertion 126 as a response to the challenge, and utilize the public key to decrypt the cryptographic device ID assertion 126 and perform a strong authentication of the device ID of the client device 104. In some examples, the VPN server 114 may determine to establish the secure tunnel 108 after performing the authentication of the device ID of the client device 104.

However, in some instances the VPN server 114 may further determine to perform a strong user identity authentication, such as when the service 110 that is being accessed is particularly sensitive or private for the user 106 (e.g., financial information, managing computing resources, etc.).

The VPN server 114 may generate another challenge for the client device 104 to authenticate a user identity of the user 106. The VPN server may send the challenge to the client device 104 to authenticate the user identity of the user 106 in various ways. The client device 104 may receive the challenge, and website may prompt the user 106 to prove their identity using various mechanisms. To verify the identity of the user 106, various user identifier(s) 128 may be utilized. For instance, the authenticator 122 of the client device 104 may utilize a universal $2^{nd}$ factor (U2F) to authenticate a user, such as by using a specialized Universal Serial Bus (USB) or near-field communication (NFC) device that is registered for the particular user 106. Additionally, or alternatively, the authenticator 122 of the client device 104 may authenticate the user's 106 identity using a universal authentication framework (UAF) protocol, such as scanning the user's 106 fingerprint using a fingerprint scanner, having the user 106 speak into a microphone, having the user enter a PIN, and/or other UAF protocols. In this way, the authenticator 122 may verify that the client device 104 is being operated by an authorized user 106 based on proving the user identity, and utilize the private key to create a cryptographic user ID assertion 130 to respond to the VPN server's 114 challenge to indicate that the user identity is authentic. The VPN server 114 may receive the cryptographic user ID assertion 130 and use the public key to decrypt the cryptographic user ID assertion 130 to verify the user identity of the user 106. As noted above, the VPN server 114 and client device 104 may utilize a particular authentication service 132, such as WebAuthn. However, other authentication services 132 may be utilized to perform strong authentication of user identities and/or device identities as described herein.

In some examples, the VPN server 114 may establish the secure tunnel 108 after authenticating the device identity and/or user identity. However, in some instances the VPN server 114 may further analyze posture data of the client device 104 prior to establishing the secure tunnel 108. For example, the client agent 120 may gather posture data 134 that indicates a state or states of the client device 104. For instance, the posture data 134 may indicate various state information about the client device 104 that is indicative of whether the client device 104 is under attack or vulnerable to attack. Examples of the posture data 134 may include OS/application patch versions to determine if patches are expired, rollback of patches to vulnerable versions, vulnerable applications executing on the client device 104, unknown or unauthorized applications running on the client device 104, work-around log ins on the client device 104, and so forth. The service provider network 102 may include a posture-assessment service 136 configured to analyze the posture data 134, such as by evaluating the posture data 134 against a security policy and/or a set of security policies. In some examples, the security policy or policies may be defined using an interface that allows for policy language to be defined about what state the client device 104 should be in prior to establishing the secure tunnel 108. For instance, the security policy may require that patches be current on the client device 104 prior to establishing the secure tunnel 108. The posture-assessment service 136 may evaluate the posture data 134 against the security policy or policies and provide posture results to the VPN server 114. The posture results 138 may notify the VPN server 114 that the posture data 134 indicates that the client device 104 is in a bad state, or an unhealthy state, and that the secure tunnel 108 should not be created. Alternatively, the posture data 134 may indicate that the client device 104 is in a good state, or a healthy state, and that the secure tunnel 108 should be created or established with the client device 104.

In examples where the secure tunnel 108 is established with the client device 104, the VPN server 114 may determine one or more routes to the services 110 that are permitted to be generated to provide the client device 104 with connection or access to the services 110. For instance, the VPN server 114 (or another device or devices in the service provider network 102) may include a routing component to determine what routes are to be generated, or are allowed to be defined, to the services 110. In some instances, the routes may similarly be determined based on posture results 138 from the posture-assessment service 136. For example, the services 110 may similarly be associated with one or more security policies that define states of the client device 104 in which the client device 104 is permitted to access the services 110. The services 110 may, in some examples, require different posture levels for the client device 104. Thus, the posture-assessment service 136 may similarly evaluate the posture data 134 against the security policy or policies to determine if the client device has an appropriate posture level, or state, to connect to or access each of the services 110. The routing component may determine, based on the posture results 138, which of the services 110 the client device 104 is permitted to access, and which of the services 110 the client device 104 is not permitted to access. The routing component may then overlay a set of routes and pass the allowed routes back to the VPN server 114. The VPN server 114 would then know the state for the connection to the services 110, and what services 110 the client device 104 is permitted to access.

In various examples, the posture-assessment service 136 may continuously, or periodically, receive updated posture data 134 from the client device 104. The posture-assessment service 136 may continue to perform posture assessment to determine if the state of the client device 104 has changed such that a route needs to be terminated due to the state of the client device becoming unhealthier, or if a new route needs to be added due to the state of the device becoming healthier. Thus, the posture-assessment service 136 may dynamically perform posture assessment on the state of the client device, and the VPN server 114 may in turn dynamically manage or modify (e.g., add and remove) the routes to services 110 the client device 110 is permitted to access.

The services 110 may each include respective service agents 140 that execute to perform various operations for the services 110. For example, the service agents 140 may be configured to call back to the VPN server 114 and request the cryptographic assertions 126 and/or 130 that were used to authenticate the client device 104 and/or user 106. For example, the service agents 140 may be configured to call the VPN server 114, such as through an API call, to determine the client device 104 and/or the user 106 that is attempting to utilize the services 110. In some examples, the service agent 140 may receive the cryptographic assertions 126 and/or 130, and further include the public key, to verify the device identity of the client device and/or to verify the user identity of the user 106. In this way, the service agents 140 may enable services 110 to authenticate the users 106 and/or client devices 104 identities by themselves. Rather than implicitly trusting every client device 104 and user 106, the service agent 140 may determine the session and identifiers, call back for the cryptographic assertions 126 and/or 130, and perform authentication of the client device 104 and/or user 106 on their own.

FIG. 2 illustrates an example environment 200 in which a service provider network 102 uses a cryptographic protocol to authenticate a device identity of a client device 104, and/or a user identity of a user 106. In some examples, the VPN server 114 may utilize WebAuthn to authenticate the device identity and/or user identity. Generally, WebAuthn API gives web applications 202 user-agent-mediated access to authenticators 122, which are often hardware tokens accessed over USB/BLE/NFC or modules built directly into the platform. The authenticator 122 may comprise a device or component that can generate public/private key pairs and gather consent for signing, such as using a fingerprint read. The authenticator 122 can authenticate user identity using a platform authenticator (such as a fingerprint scanner), or attached through USB, BLE, or NFC.

When the user 106 wants to register a credential with the VPN server 114, such as the device identity or user identity, the VPN server 114 (or "relying party") may perform various operations. The following description of FIG. 2 is with respect to setting up a user identifier credential with the VPN server 114, such as a fingerprint reader. The user 106 may register an account with the VPN server 114, such as for use of a service 110, and the VPN server 106 may being the registration process to register the user identifier credential.

The VPN server 114 may generate a challenge, which may be a large random number used in the registration process, and stores the challenge 204 in associated with the user account. The VPN server 114 further transmits along with the challenge 204 various user information 206 to the web application 202 that is running in a browser for the client device 106. The web application 202 may call the WebAuthn API using a "create" call to create a new public key credential, and specify the challenge 204 received from the VPN server 114, the user information 206 to be displayed on the authenticator if it has to be displayed (e.g., not a silent authenticator), and cryptography parameters that are to be used. In addition to the parameters, the browser also extracts the domain name 208 of the calling web application 202. All of this information is sent to the authenticator 122 on the client device 104 which asks for user 106 consent. For instance, the authenticator 122 may request that the user 106 scan their fingerprint. In this way, malicious APIs are unable to perform the task due to user input being require, which protects the user's 106 privacy.

After the user 106 gives consent, the authenticator 122 generates a new public/private key pair, stores the private key 210 internally along with the credential ID 212, user information 206, and the domain name 208 to which the credential belongs. Then, the API call is resolved with the public key credential that contains the unique identifier, the public key 214 and the signature 216 calculated over the challenge 204, the domain name 208, the credential ID, and other parameters. The web application 202 may then forward the IDs to the VPN server 114.

The VPN server 114 may then verify the signature 216 and if the signature 216 checks out, the VPN server 114 stores the credential ID 212 and the public key 214 in association with the user account for the user 106. Additionally, the VPN server 114 may invalidate the challenge 212 as it is valid for one transaction. In this way, the VPN server 114 may store a public key that corresponds to a private key 210 stored by the client device 106. Additionally, the VPN server 114 may be able to later authenticate the user identity for the user 106 without actually receiving sensitive data, such as data representing the user's 106 fingerprint. In this way, the user 106 may register their user identity with the VPN server 114. However, the techniques may be similarly applied using a device identifier 124 rather than the user identifier.

After registration, the user 106 may attempt to log-in to their account to utilize the service 110 for which they are registered to use. During authentication, the process may be similar to registration by using the authenticator 122 without the password. The authenticator 122 already has the private key 208, and the VPN server 114 has the public key 214 stored in association with the user's 106 account. Authentication may be performed using a challenge/response based protocol where the user 106 calculates a cryptographic signature (or assertion) to prove possession of the private key 208. Authentication states when the VPN server 114 generates a challenge 204, or a large random number that is used to prevent replay attacks. The VPN server 114 transmits the challenge 204 to the web application 202, which in turn calls the web authentication API (e.g., authentication service 132). To create the cryptographic signature 216, the web application 202 may call using a "get.assertion" call, call navigator credentials with the public key option and specify the challenge 204 that was received from the VPN server 114, and the credential for which the cryptographic signature 216 is desired. Additionally, the browser may extract the domain name 208 of the web application 202 and send it to the authenticator 122.

The authenticator 122 may look up information stored for the credential ID 212, and check the domain name 208 of the calling website to determine that it matches the one that was called at the time the credential ID 212 was created. In this way, the authenticator 122 is resistant to phishing attacks from websites with different domain names. For instance, if the user 106 is on a phishing page with a different URL than the stored domain name 208, the authenticator will notice the discrepancy and determine that there is a phishing attack. The authenticator 122 may then preform local verification (e.g., fingerprint scanning), and if it checks out, the authenticator 122 uses the private key 210 to generate a cryptographic signature (or assertion) over the domain name 208 and the challenge 204. The API call is then resolved with the signature 216 that is sent to the VPN server 114 where it is verified that is corresponds to the challenge 204 and the public key 214. If the signature 2216 or assertion is verified by the VPN server 114, then the authentication of the user identity is successful. While the techniques described with respect to FIG. 2 are with reference to authenticating a user identity, the techniques are similarly applicable for authenticating a device identity as well.

Figure 3:
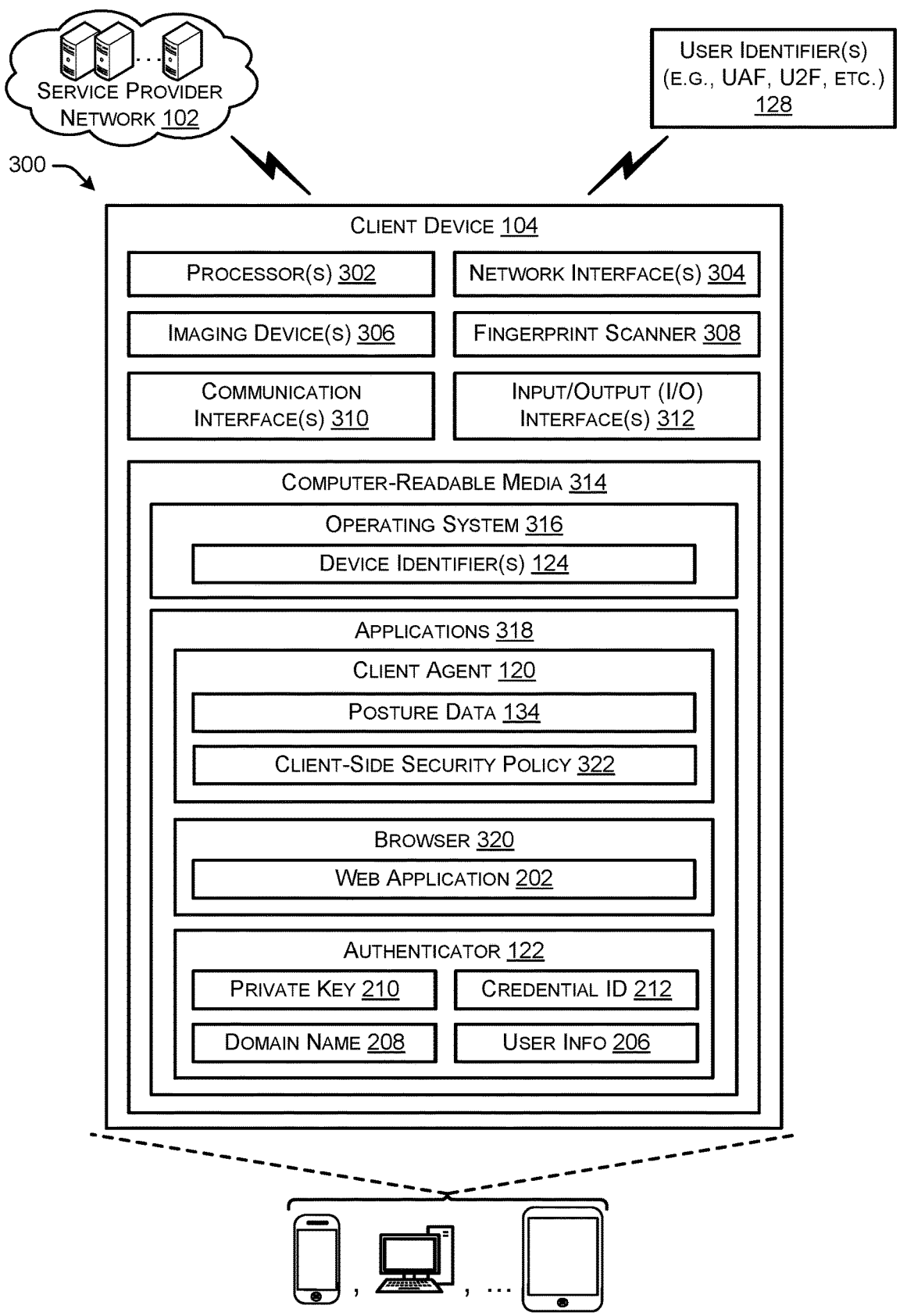
FIG. 3 illustrates a component diagram of an example client device that includes components to establish a secure tunnel with a service provider network, and provide posture data to the service provider network.

FIG. 3 illustrates a component diagram 300 of an example client device 104 that includes components to establish a secure tunnel 108 with a service provider network 102, and provide posture data to the service provider network 102.

Generally, the client device 104 may comprise any type of computing device (e.g., telephone device, tablet device, laptop computing device, mobile device, etc.) configured to send and receive data, and perform computing functions. The client device 104 may include one or more processors 302 configured to power operations of the device 104, and further include one or more network interfaces 304. The network interface(s) 304 may configure the client device 104 to communicate over various types of network(s) 118. For instance, the network interface(s) 304 may include a wireless or Wi-Fi network communications interface, an Ethernet communications interface, a cellular network communications interface, a Bluetooth communications interface, etc., for communications with devices over various types of network(s) 118, including wide-area network, local-area networks, private networks, public networks etc. In the case of a wireless communications interfaces, such interfaces may include radio transceivers and associated control circuits and logic for implementing appropriate communication protocols. The network interface(s) 304 may utilize one or more antennas of the user device to send and receive signals over various networks. Although described as being a WAN network, such as the internet, the network(s) 118 may include wireless wide area networks (WWANs), such as 3G networks, 4G networks, 4G LTE networks, and so forth, Personal Area Networks (PANs), Local Area Networks (LANs), Campus Area Networks (CANs), Metropolitan Area Networks (MANs), Broadband Global Area Networks (BGANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. In some examples, the network(s) 118 may represent an array of wired networks, wireless networks (e.g., WiFi), or combinations thereof.

The client device 104 may further include one or more imaging devices 306, such cameras, still cameras, thermal imaging devices, and/or any other type of imaging device. The imaging devices may be utilized to generating image data representing a face of the user 106 to be used for facial recognition. In some instances, facial recognition may be utilized as a type of user identifier 128, similar to a fingerprint. The client device 104 may also include a fingerprint scanner 308 configured to obtain sensor data representing a fingerprint of the user 106. The fingerprint scanner 308 may further be used to identity a fingerprint of authorized users 106, or as a means to collect a user identifier 128.

The client device 104 may include one or more communication interfaces 310, such as auxiliary ports, USB ports, NFC communication interfaces, Bluetooth interfaces, WiFi interfaces, and/or other communication interfaces to configure the client device 104 to communicate with external devices. additionally, the client device 104 may include input/output (I/O) interfaces 312 configured to receive input from a user 106, and provide output to the user 106. For instance, the I/O interfaces 312 may include a touch display to receive touch input from the user (e.g., a touch PIN for user identification), and display output data to the user (e.g., notify the user to provide a particular form of user identity for authorization). The I/O interface(s) 312 may further include a speaker to output audio, and a microphone to generate audio signals representing sound in the environment of the client device 104. In some examples, the user 106 may speak into the microphone as a means for authenticating the user identity of the user 106, such as by performing speaker/voice recognition on the audio signal representing the user's 106 speech.

The client device 104 may further comprise computer-readable media 314 that stores various components, modules, and/or data described herein. The computer-readable media 314 may store an operating system 316 configured to manage software, firmware, and/or hardware resources of the client device 104. The operating system 316 may comprise any type of operating system 316 known in the art, and include, store, or otherwise be associated with the device identifiers 124. For example, the operating system 316 may have a native OS identifier burned in it during manufacturing.

The computer-readable media 314 may also store applications 318, including the client agent 120, a browser 320 in which the web application 202 executes, and the authenticator 122. The client agent 120 may monitor the client device, such as applications, scripts, patches, etc., and determine the posture data 134 as described herein. Further, the client agent 120 may also include a client-side security policy 322. Similar to the techniques described as being performed at the service provider network 102, the client agent 120 may continuously, or periodically, collect the posture data 134 and evaluate the posture data 134 against the client-side security policy 322 to determine whether the client device 104 is in a state to establish the secure tunnel 108, to determine whether to terminate an already established secure tunnel 108, and/or to determine whether the client device 108 is in a state to connect to a particular service 110. In this way, the client agent 120 may perform front-end posture assessment on the posture data 134 to determine what, if any, connections the client device 104 is permitted to establish based on the state of the client device (e.g., how healthy the state of the client device 104 is). For instance, the client agent 120 may determine that an OS patch for the operating system 316 is old, or vulnerable to attack, and the client agent 120 may determine that the OS patch violates a client-side security policy 322. In such examples, the client agent 120 may refrain from establishing the secure tunnel 108 with the VPN server 114, or terminate the secure tunnel 108 with the VPN server 114.

The browser 320 may comprise any type of web browser or program with a graphical user interface for displaying files, such as HTML files, used to navigate the Internet. The web application 202 may run in the browser 320 and perform various operations for authenticating the client device 104 as described herein.

FIGS. 4, 6A, 6B, and 7 illustrate flow diagrams of example methods 400, 600, and 700 that illustrate aspects of the functions performed at least partly by the service network provider 102 as described in FIGS. 1-3 and 5. The logical operations described herein with respect to FIGS. 4, 6A, 6B, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4, 6A, 6B, and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4:
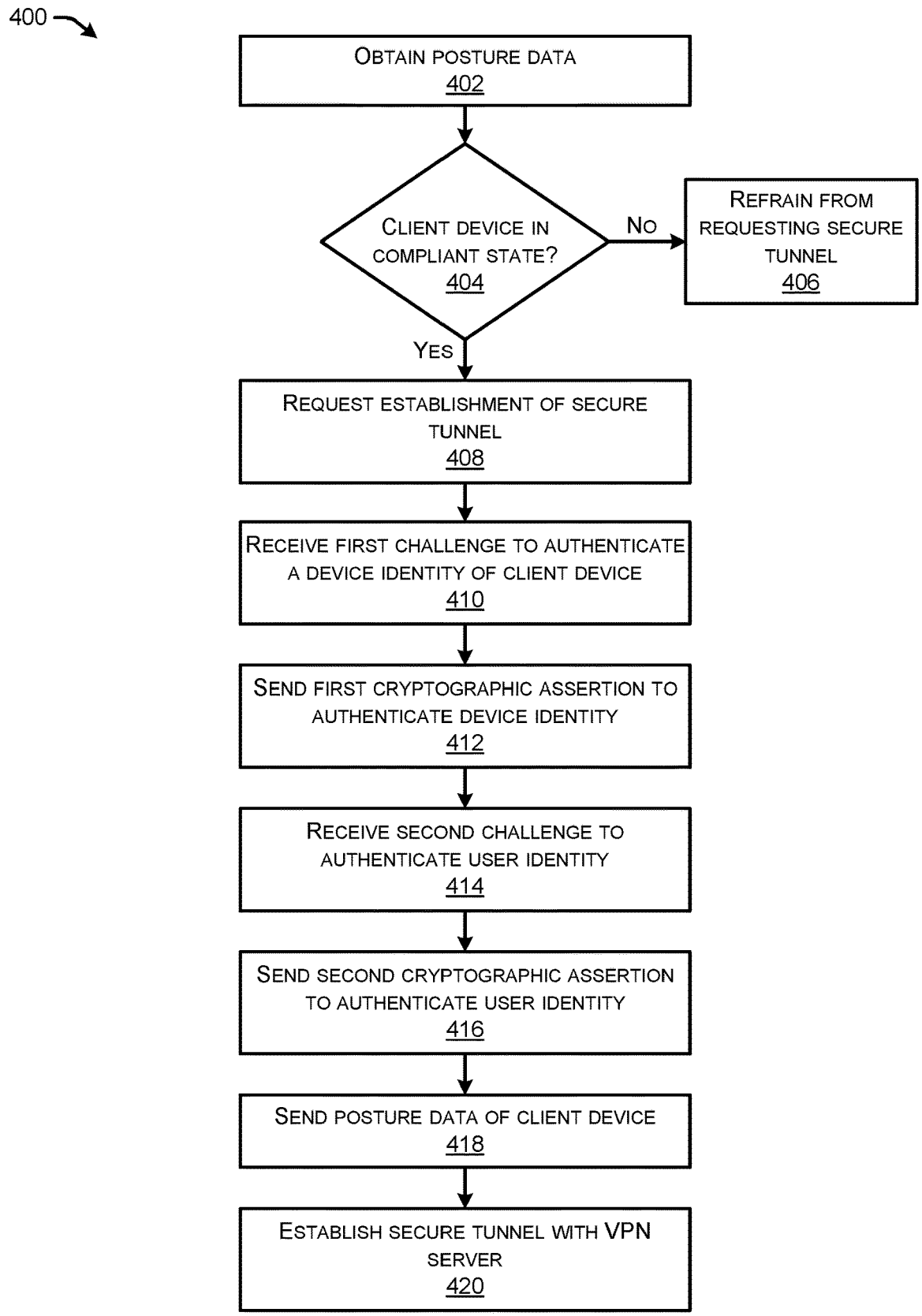
FIG. 4 illustrates a flow diagram of an example method performed by a client device for authenticating a device identity and/or user identity with a service provider network to establish a secure tunnel, and providing posture data to generate a route to a service.

FIG. 4 illustrates a flow diagram of an example method 400 performed by a client device 104 for authenticating a device identity and/or user identity with a service provider network 102 to establish a secure tunnel 108, and providing posture data 134 to generate a route to a service 110.

At 402, the client agent 120 may obtain posture data 134. For instance, the client agent 120 may be continuously, or periodically, determining the posture data 134 that indicates the state of the client device 104. The client agent 104 may determine patch versions, whether patches have been rolled back, identify vulnerable applications, identify potentially malicious software or applications stored and/or executing on the client device 104, and/or other indications of healthy or unhealthy states.

At 404, the client agent 120 may determine whether the client device 104 is in a compliant state or not. For example, the client agent 120 may evaluate the posture data 134 against the client-side security policy 322 to determine whether the state of the client device 120 is compliant to establish the secure tunnel 108 with the VPN server 114.

At 406, the client agent 120 may refrain from requesting the secure tunnel 406 because the client device 104 was determined to not be in a compliant state. In some examples, the client agent 120 may not allow the VPN server 114 to attempt to establish a connection between the client device 104 and a service 110.

At 408, if the client agent 120 determines that the client device 104 is in a compliant state, the client device 104 may request establishment of the secure tunnel 108 with the VPN server 114. For instance, the user 106 may navigate to a log-in page and the client device 104 (e.g., web application 202) may request the VPN server 114 to establish a secure tunnel after the user 104 enters their credentials to log-in.

At 410, the client device 104 may receive a first challenge to authenticate a device identity of the client device 104. For instance, the VPN server 114 may send a challenge using the WebAuthn protocol to have the client device 104 verify a device identity, such as a native OS identity.

At 412, the client device 104 may send a first cryptographic assertion to authenticate the device identity of the client device 104. For instance, the authenticator may sign a cryptographic assertion using the private key 210 based on verifying that the device identity of the client device 104, such as by verifying a native OS identifier.

At 414, the client device 104 may receive a second challenge to authenticate a user identity of the user 106. For instance, the VPN server 114 may send another challenge to perform second-authentication before establishing the secure tunnel 108. The second challenge may be a challenge to authenticate a user identity of the user 106.

At 416, the client device 104 may send a second cryptographic assertion to authenticate the user identity of the user 104. For instance, the authenticator may utilize a universal $2^{nd}$ factor (U2F) to authenticate the user 106, such as by using a specialized Universal Serial Bus (USB) or near-field communication (NFC) device that is registered for the particular user 106. Additionally, or alternatively, the authenticator 122 may authenticate the user identity using a universal authentication framework (UAF) protocol, such as scanning a user's 106 fingerprint using a fingerprint scanner, having the user 106 speak into a microphone, having the user enter a PIN, and/or other UAF protocols. After authenticating the user 106, the authenticator may sign a cryptographic assertion using the private key 210 to authenticate the user's 106 identity, and send the second cryptographic assertion to the VPN server 114.

At 418, the client device 104 may send the posture data 134 to the VPN server 114. The client device 104 may send the posture data 134 prior to establishing the secure tunnel 108, and/or continuously or periodically after the secure tunnel 108 is established.

At 420, the client device 104 may establish the secure tunnel with the VPN server 114. For instance, the client device 104 and VPN server 114 may encapsulate data sent over the network(s) 118 back and forth using the agreed upon encryption scheme or protocol.

Figure 5:
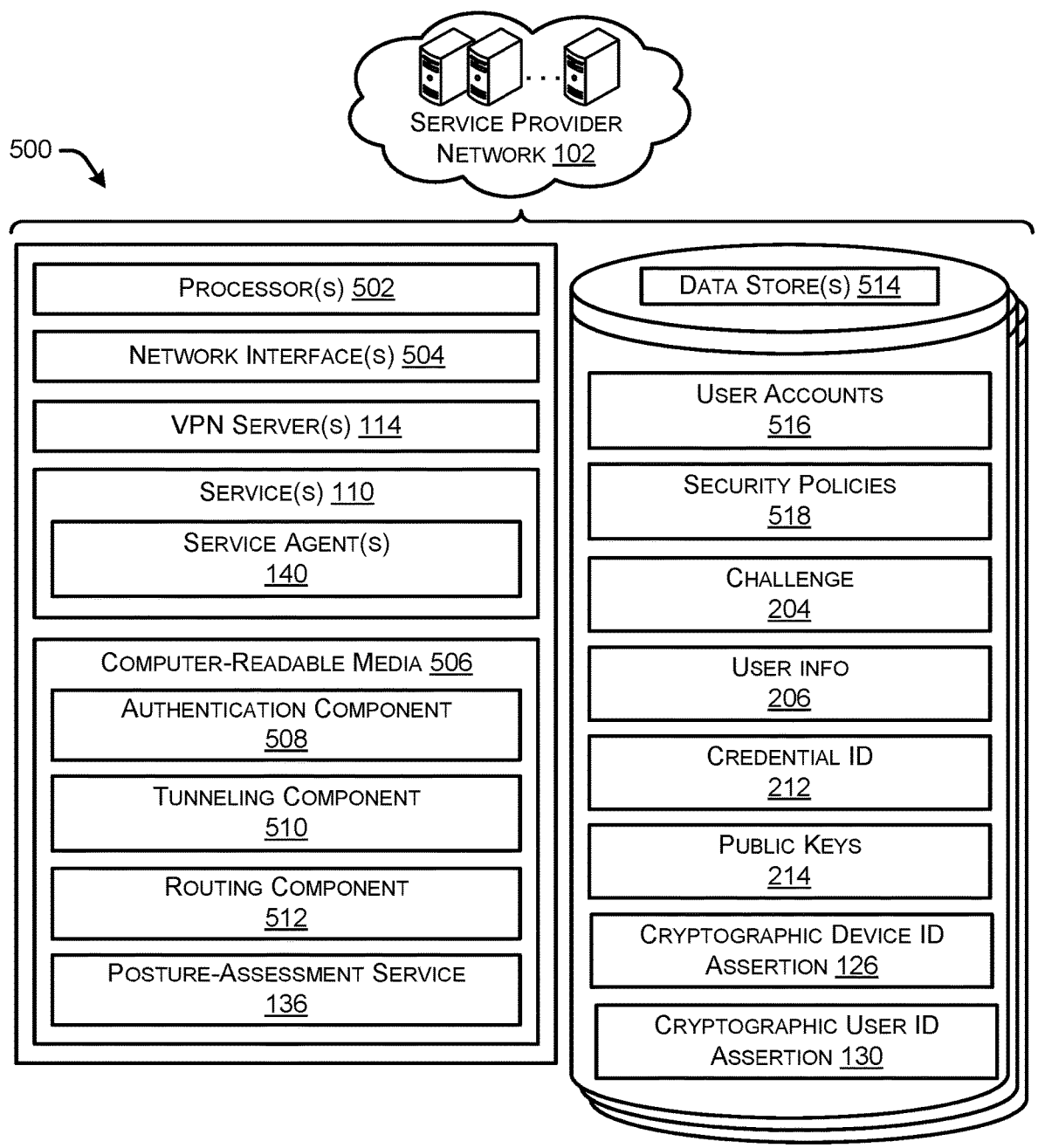
FIG. 5 illustrates a component diagram of an example service provider network that includes components to establish secure tunnels with client devices, and evaluate posture data for the client devices to determine with which services the client devices are permitted to communicate.

FIG. 5 illustrates a component diagram 500 of an example service provider network 102 that includes components to establish secure tunnels 108 with client devices 104, and evaluate posture data 134 for the client devices 104 to determine with which services 110 the client devices 104 are permitted to communicate.

As illustrated, the service provider network 502 may include one or more processors 502 configured to power components and modules of the service provider network 102. The service provider network 102 may comprise one, or multiple, devices interconnected by one or more networks. The service provider network 102 may include one or more network interfaces 504 to communicate over various networks, such as networks 118. Further, the service provider network 102 may include various components and devices described herein, including one or more VPN servers 114 and the one or more services 110. Further, the service provider network 102 may include computer-readable media 506, stored in one device or across multiple devices, that stores various components. For example, the computer-readable media 506 may store an authentication component 508 configured to authenticate device identities and/or user identities according to the techniques described herein, such as with respect to FIGS. 1 and 2. Additionally, the computer-readable media 506 may store a tunneling component 510 to perform various operations for establishing the secure tunnel 108, such as performing a cryptographic protocol to establish the secure tunnel 108. The routing component 512 may be configured to generate, determine, overlay, or otherwise provide routes based on the posture results 138 received from the posture-assessment service 136. The posture-assessment service 126 may utilize the security policies 518 to evaluate the posture data 134 for the reasons described herein, such as tunnel establishment and route management. The service provider network 102 may manage user accounts 516, which may each be associated with respective challenges 204, user info 206, credential IDs 212, and/or public keys 214.

Figure 6A:
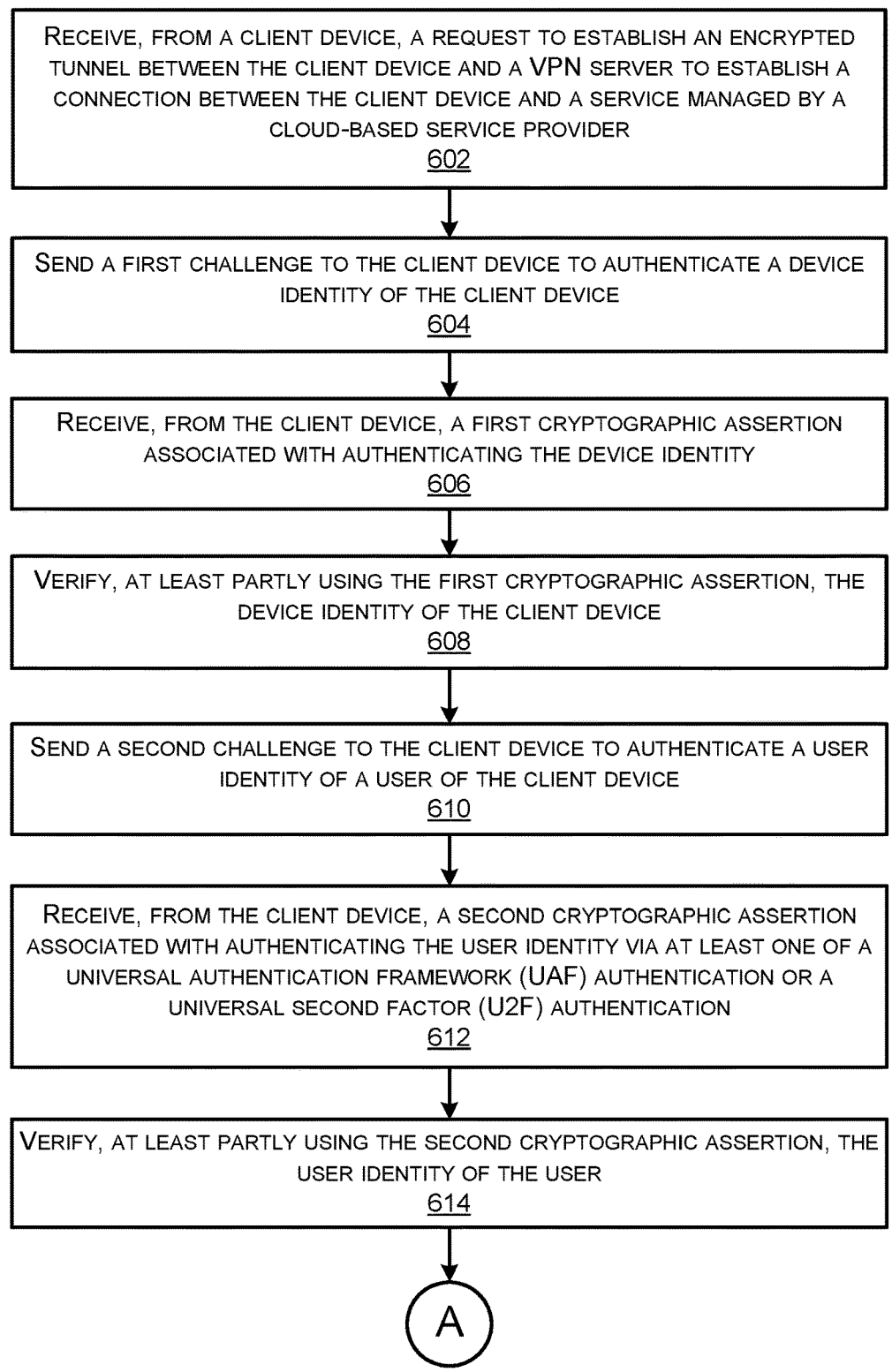
FIGS. 6A and 6B illustrate a flow diagram of an example method performed by a service provider network for authenticating a device identity and a user identity for a client device to establish a secure tunnel for the client device to access a service.
Figure 6B:
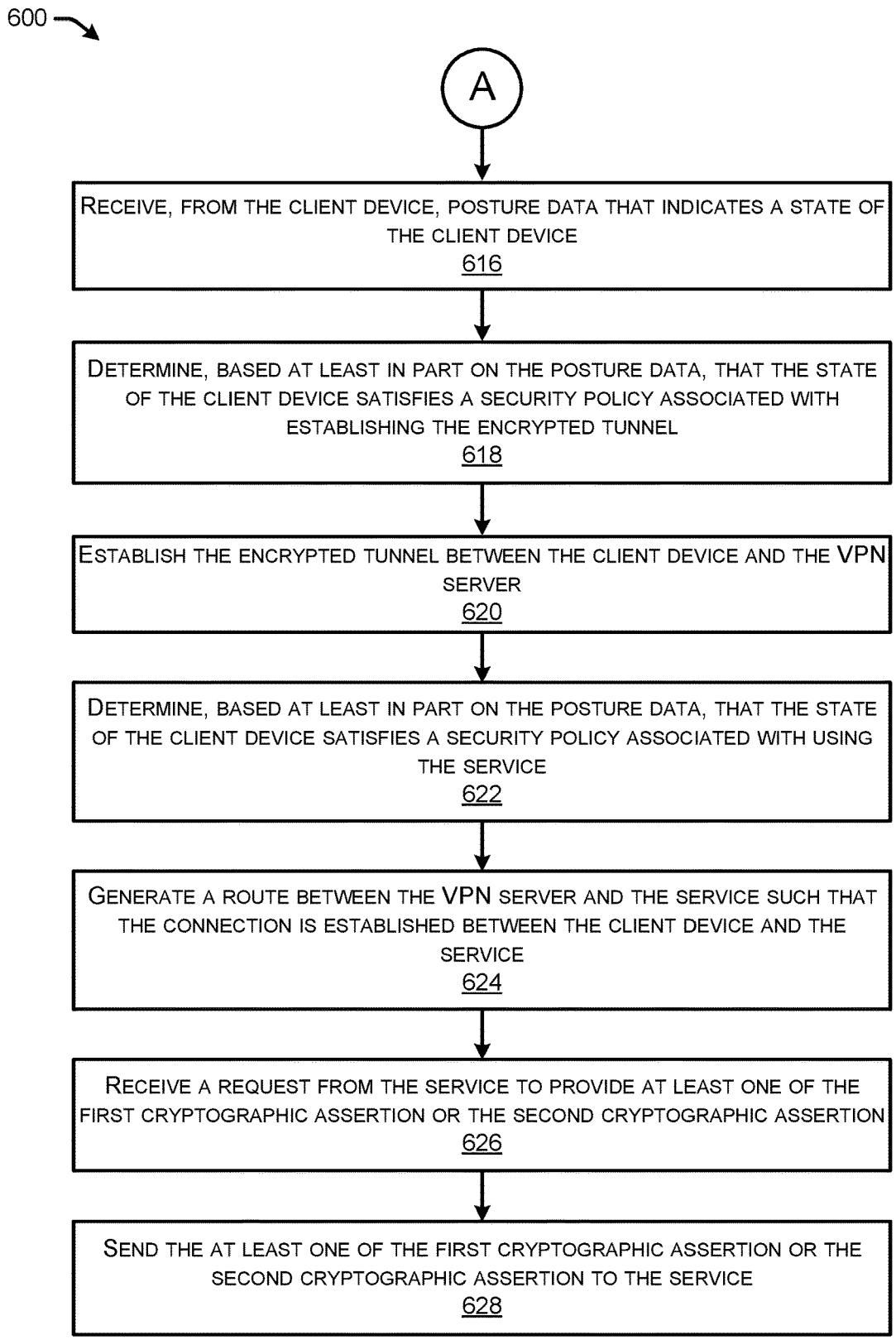

FIGS. 6A and 6B illustrate a flow diagram of an example method 600 performed by a service provider network 102 for authenticating a device identity and a user identity for a client device 104 to establish a secure tunnel 108 for the client device 104 to access a service 110. However, the operations described below may be performed by one or more devices in a service provider network 102, and/or by one or more devices in any other type of network.

At 602, the service provider network 102 may receive, from a client device 104, a request to establish an encrypted tunnel 108 between the client device 104 and a VPN server 114 to establish a connection between the client device 104 and a service 110 managed by a cloud-based service provider (e.g., service provider network 102).

At 604, the service provider network 102 may send a first challenge to the client device 104 to authenticate a device identity of the client device 104. At 606, the service provider network 102 may receive, from the client device 104, a first cryptographic assertion associated with authenticating the device identity. At 608, the service provider network 102 may verify, at least partly using the first cryptographic assertion, the device identity of the client device 104.

At 610, the service provider network 102 may send a second challenge to the client device 104 to authenticate a user identity of a user 106 of the client device 104. At 612, the service provider network 102 may receive, from the client device 104, a second cryptographic assertion associated with authenticating the user identity via at least one of a universal authentication framework (UAF) authentication or a universal second factor (U2F) authentication. At 614, the service provider network 102 may verify, at least partly using the second cryptographic assertion, the user identity of the user 106.

In some examples, at 616 the service provider network 102 may receive, from the client device 104, posture data 134 that indicates a state of the client device 104. In such examples, at 618, the service provider network 102 may determine, based at least in part on the posture data 138, that the state of the client device 108 satisfies a security policy associated with establishing the encrypted tunnel 108.

At 620, the service provider network 102 may establish the encrypted tunnel 108 between the client device 104 and the VPN server 114. In some examples, the encrypted tunnel 108 may be established based at least in part on the state of the client device satisfying the security policy and verifying the device identity and the user identity.

At 622, the service provider network 102 may determine, based at least in part on the posture data 138, that the state of the client device 104 satisfies a security policy associated with using the service 110. In such examples, at 624, the service provider network 102 may generate a route between the VPN server 114 and the service 110 such that the connection is established between the client device 104 and the service 110. At 626, the service provider network 102 may receive a request from the service 110 to provide at least one of the first cryptographic assertion or the second cryptographic assertion. At 628, the service provider network 102 may send the at least one of the first cryptographic assertion or the second cryptographic assertion to the service 110.

Figure 7:
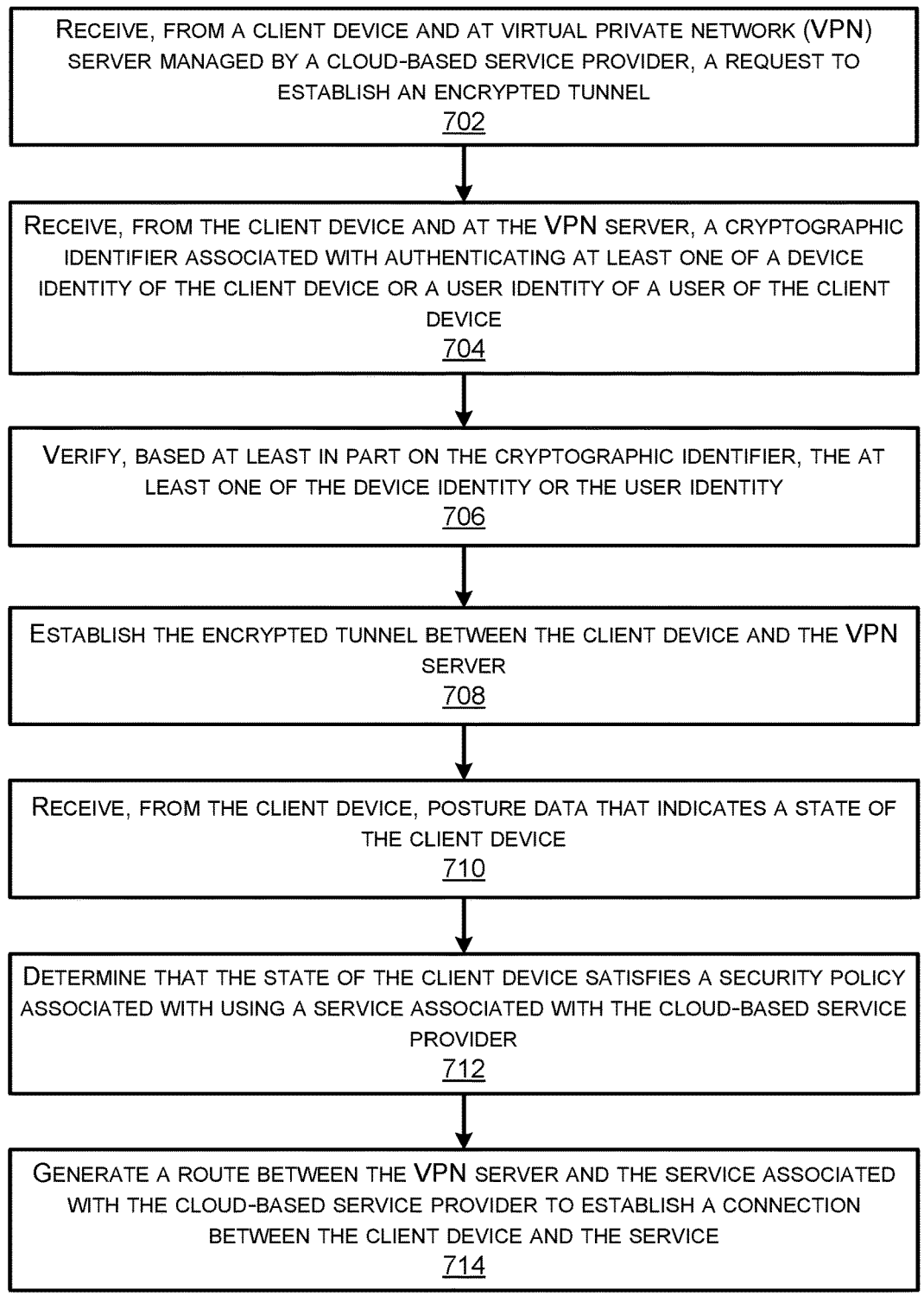
FIG. 7 illustrates a flow diagram of an example method performed by a service provider network for authenticating at least one of a device identity or a user identity for a client device to establish a secure tunnel, and evaluating posture data for the client device to generate a route to a service for the client device.

FIG. 7 illustrates a flow diagram of an example method 700 performed by a service provider network 102 for authenticating at least one of a device identity or a user identity for a client device 104 to establish a secure tunnel 108, and evaluating posture data 138 for the client device 104 to generate a route to a service 110 for the client device 104. The order in which the steps 702-714 are listed does not necessarily mean the steps must be performed in the sequence or order. For instance, the steps may be performed in different orders, and/or in parallel or at least partly during times that at least partly overlap. For instance, the posture data may be received and evaluated against a security policy before the tunnel is established, at least partly at a same time as establishing the tunnel, and/or after the tunnel is established.

At 702, the service provider network 102 may receive, from a client device 104 and at virtual private network (VPN) server 114 managed by a cloud-based service provider (e.g., service provider network 102), a request to establish an encrypted tunnel 108.

At 704, the service provider network 102 may receive, from the client device 104 and at the VPN server 114, a cryptographic identifier associated with authenticating at least one of a device identity of the client device 104 or a user identity of a user 106 of the client device 104.

At 706, the service provider network 102 may verify, based at least in part on the cryptographic identifier, the at least one of the device identity or the user identity. At 708, the service provider network 102 may establish the encrypted tunnel 108 between the client device 104 and the VPN server 114.

At 710, the service provider network 102 may receive, from the client device 104, posture data 134 that indicates a state of the client device 104. At 712, the service provider network 102 may determine that the state of the client device 104 satisfies a security policy associated with using a service 110 associated with the cloud-based service provider 102. At 714, the service provider network 102 may, based at least in part on the state of the client device 104 satisfying the security policy, generate a route between the VPN server 114 and the service 110 associated with the service provider network 102 such that a connection is established between the client device 104 and the service 110.

In some examples, the posture data may comprise first posture data 134 indicating a first state of the client device, and the service provider network 102 may further receive, from the client device 104, second posture data 134 indicating a second state of the client device 104. The service provider network 102 may determine that the second state of the client device 104 violates the security policy associated with using the service 110. The service provider network 102 may then terminate the route between the VPN server 113 and the service 110 based at least in part on the second state of the client device 104 violating the security policy.

In some examples, the posture data 134 comprises first posture data 134 indicating a first state of the client device 104, the security policy comprises a first security policy, and the service provider network 102 may receive, from the client device 104, second posture data 134 indicating a second state of the client device 104. The service provider network 102 may determine that the second state of the client device 104 violates a second security policy associated with establishing the encrypted tunnel 108. In such examples, the service provider network 102 may terminate the encrypted tunnel 108 between the VPN server 114 and the client device 104 based at least in part on the second state of the client device 104 violating the second security policy.

In some examples, the method 700 further includes receiving, from the service 110 and at the VPN server 114, a request for the cryptographic identifier. The service provider network 102 may then send the cryptographic identifier to the service 110.

In some examples, the cryptographic identifier comprises a first cryptographic identifier associated with authenticating the device identity of the client device 104. In such examples, verifying the at least one of the device identity or the user identity comprises verifying the device identity of the user device 104 based at least in part on the first cryptographic identifier. In such examples, the method 700 may further comprise receiving, from the client device 104, a second cryptographic identifier associated with authenticating the user identity of the user 106 via at least one of a universal authentication framework (UAF) authentication or a universal second factor (U2F) authentication. Further, the service provider network 102 may verify, at least partly using the second cryptographic identifier, the user identity.

In some examples, the service provider network 102 may determine that the service 110 to which the client device 104 is establishing the connection requires a multi-factor authentication. In such examples, based at least in part on the service requiring the multi-factor authentication, the service provider network 102 may send a challenge to the client device 104 to authenticate the user identity of the user 106.

In some examples, the VPN server 114 may continuously, or periodically, receive posture data 134 from the client device 104. For instance, the client device 104 may be configured to report posture data 134 according to a predefined schedule. In such examples, the VPN server 114 may reevaluate the posture data 134 at the posture-assessment service 136 each time the posture data 134 is received and determine whether or not to add or remove routes, and/or terminate the tunnel 108. Further, the service provider network 102 may know the schedule by which the client device 104 is to report the posture data 134. Thus, the service provider network 102 may determine that the client device failed to report the posture data 134 for one of the scheduled times, or that the posture data 134 was not received for some other reason (e.g., the posture data 134 was lost in communication). In such examples, the service provider network 102 may perform various operations. For instance, the service provider network 102 may determine that the client device 104 has been compromised because the posture data 134 was not received, and the service provider network 102 may terminate at least one route to one or more services, and/or terminate the secure tunnel 108. Thus, failing to receive posture data 134 at scheduled times may indicate that the client device 104 is compromised, and the service provider network 102 may take affirmative steps to protect the VPN server 114 and/or services 110.

Figure 8:
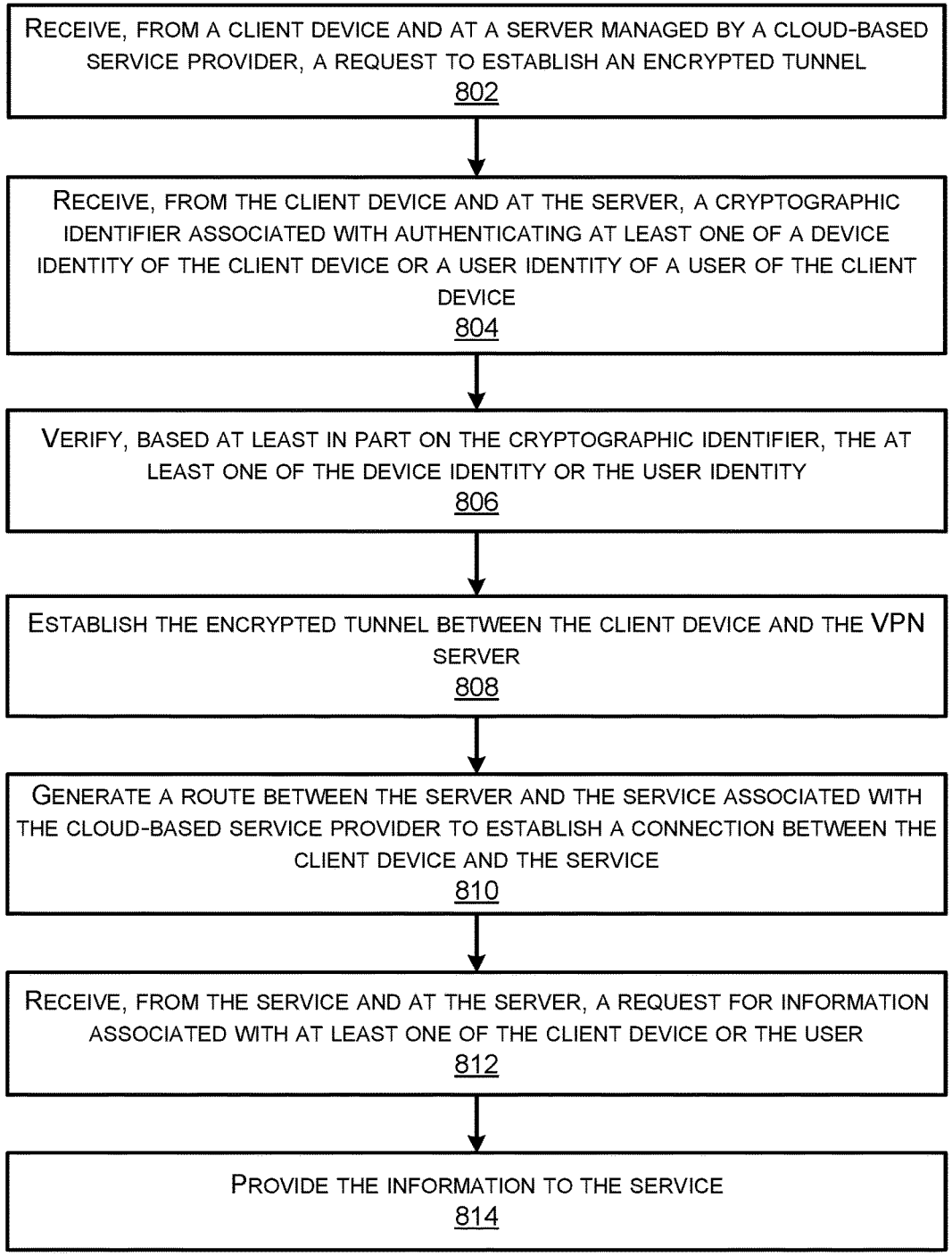
FIG. 8 illustrates a flow diagram of an example method performed by a service provider network for authenticating a device identity or a user identity, establishing a secure tunnel, and allowing a service to call back to a server to receive information about the client device or user.

FIG. 8 illustrates a flow diagram of an example method 800 performed by a service provider network for authenticating a device identity or a user identity, establishing a secure tunnel, and allowing a service to call back to a server to receive information about the client device or user.

At 802, the service provider network 102 may receive, from a client device 104 and at a server 114 managed by a cloud-based service provider (e.g., service provider network 102), a request to establish an encrypted tunnel 108.

At 804, the service provider network 102 may receive, from the client device 104 and at the VPN server 114, a cryptographic identifier associated with authenticating at least one of a device identity of the client device 104 or a user identity of a user 106 of the client device 104.

At 806, the service provider network 102 may verify, based at least in part on the cryptographic identifier, the at least one of the device identity or the user identity. At 808, the service provider network 102 may establish the encrypted tunnel 108 between the client device 104 and the VPN server 114.

At 810, the service provider network 102 may generate a route between the server 114 and the service 110 associated with the cloud-based service provider (e.g., service provider network 102) to establish a connection between the client device 104 and the service 110.

At 812, the service provider network 102 may receive, from the service 110 and at the server 114, a request for information associated with at least one of the client device or the user. For instance, the service 110 may perform an API call to the server 114, but any other type of call back may be performed. In some instances, the request for information may be a request for at least one of the cryptographic device ID assertion 126 and/or the cryptographic user ID assertion 130. In this way, the services 110 may call back to the server 114 to receive information to verify the device identity and/or user identity.

In other examples, the request for information associated with the at least one of the client device or the user may comprise any type of information that may be useful by the service 110. For instance, the request for information may be a request for a device type (e.g., cell phone, type of cell phone, tablet, type of tablet, etc.), request for information about software on the client device 104 (e.g., operating system, operating system patches, application versions, application types, etc.), a request for information about the user (e.g., user's email, user's account information, etc.), and/or any other type of information that may be helpful to the services 110. Accordingly, the services 110 are able to request information from the server 114 to help them make more intelligent decisions regarding how to interact with the client device 104 (e.g., display screen size, communication capabilities, etc.), what types of information or content to share with the client device 104, and/or other decisions. At 814, the service provider network 104 (e.g., the server 114) may provide the information to the service 110.

In some examples, the service-provider network 102 may be part of or associated with a cloud-based service network/platform that can be configured to implement aspects of the functionality described herein. For instance, the service provider network 102 may include computing resources located in geographic disparate data centers to implement at least some of the services 110 described herein. Each type of computing resource provided by the service provider network 702 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services 110 described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers. The data centers are facilities utilized to house and operate computer systems and associated components. The data centers typically include redundant and backup power, communications, cooling, and security systems. The data centers can also be located in geographically disparate locations. The data centers may be configured in different arrangements depending on the service provider network 102. For example, one or more data centers may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users 106 of the service-provider network 102 may access the computing resources provided by the data centers of the service provider network over any wired and/or wireless network(s) 118 (utilizing a client device 112 and/or another accessing-user device), which can be a wide area communication network ("WAN"), such as the Internet, an intranet or an Internet service provider ("ISP") network or a combination of such networks. For example, and without limitation, a device 104 operated by a user 106 of the service provider network 102 may be utilized to access the service provider network 102 by way of the network(s) 118. It should be appreciated that a local-area network ("LAN"), the Internet, or any other networking topology known in the art that connects the data centers to remote clients and other users can be utilized. It should also be appreciated that combinations of such networks can also be utilized.

The data centers include several server computers for providing computing resources to support the services 110. In some examples, the resources and/or server computers may include, or correspond to, the computing resources described herein for supporting the services 110. The server computers can be standard tower, rack-mount, or blade server computers configured appropriately for providing the computing resources described herein. An appropriate LAN is also utilized to interconnect the server computers. In this way, the service provider network 102 may provide the services 110 as part of a cloud-based service provider network. However, the description of the service provider network 102 has been greatly simplified. Additionally, the service provider network 102 may be implemented in a smaller scale, such as local networks provided for companies, groups of users 106, etc.

As used herein, a processor, such as processor(s) 302 and/or 502, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 302 and/or 502 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 302 and/or 502 may possess its own local memory, which also may store program components, program data, and/or one or more operating systems.

As described herein, computer-readable media 314 and/or 506 may include volatile and nonvolatile memory, removable and non-removable media implemented in any method or technology for storage of information, such as computer-readable instructions, data structures, program component, or other data. Such computer-readable media 314 and/or 506 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 302 and/or 502 to execute instructions stored on the computer-readable media 314 and/or 506. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 314 and/or 506, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

While the invention is described herein with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:
1. A system comprising:
  one or more processors;
  a virtual private network (VPN) server managed by a cloud-based service provider and configured to establish encrypted tunnels with client devices using a cryptographic protocol; and
  one or more computer-readable media storing computer-executable instructions that, when executed by the one or more processors, cause the one or more processors to:
    receive, from a client device, a request to establish an encrypted tunnel between the client device and the VPN server to establish a connection between the client device and a service managed by the cloud-based service provider;
    send a first challenge to the client device to authenticate a device identity of the client device;
    receive, from the client device, a first cryptographic assertion associated with authenticating the device identity;
    verify, at least partly using the first cryptographic assertion, the device identity of the client device;
    send a second challenge to the client device to authenticate a user identity of a user of the client device;
    receive, from the client device, a second cryptographic assertion associated with authenticating the user identity via at least one of a universal authentication framework (UAF) authentication or a universal second factor (U2F) authentication;
    verify, at least partly using the second cryptographic assertion, the user identity of the user;
    based on verifying the device identity and the user identity, establish the encrypted tunnel between the client device and the VPN server;
    generate a route between the VPN server and the service such that the connection is established between the client device and the service;
    receive a request from the service to provide at least one of the first cryptographic assertion or the second cryptographic assertion; and
    send the at least one of the first cryptographic assertion or the second cryptographic assertion to the service.

2. The system of claim 1, comprising further instructions that, when executed by the one or more processors, cause the one or more processors to:
receive, from the client device, posture data that indicates a state of the client device; and
determine, based on the posture data, that the state of the client device satisfies a security policy associated with using the service,
wherein generating the route between the VPN server and the service is performed based at least in part on the state of the client device satisfying the security policy.

3. The system of claim 1, comprising further instructions that, when executed by the one or more processors, cause the one or more processors to:
receive, from the client device, posture data that indicates a state of the client device; and
determine, based on the posture data, that the state of the client device satisfies a security policy associated with establishing the encrypted tunnel,
wherein establishing the encrypted tunnel between the client device and the VPN server is performed based at least in part on the state of the client device satisfying the security policy.

4. A computer-implemented method comprising:
receiving, from a client device and at a server managed by a cloud-based service provider, a request to establish an encrypted tunnel;
receiving, from the client device and at the server, a cryptographic identifier associated with authenticating at least one of a device identity of the client device or a user identity of a user of the client device;
verifying, based at least in part on the cryptographic identifier, the at least one of the device identity or the user identity;
establishing the encrypted tunnel between the client device and the server;
receiving, from the client device, posture data that indicates a state of the client device;
determining that the state of the client device satisfies a security policy associated with using a service associated with the cloud-based service provider; and
based at least in part on the state of the client device satisfying the security policy, generating a route between the server and the service associated with the cloud-based service provider to establish a connection between the client device and the service.

5. The computer-implemented method of claim 4, wherein the posture data comprises first posture data indicating a first state of the client device, further comprising:
receiving, from the client device, second posture data indicating a second state of the client device;
determining that the second state of the client device violates the security policy; and
terminating the route between the server and the service based at least in part on the second state of the client device violating the security policy.

6. The computer-implemented method of claim 4, wherein the posture data comprises first posture data indicating a first state of the client device, the security policy comprises a first security policy, further comprising:
receiving, from the client device, second posture data indicating a second state of the client device;
determining that the second state of the client device violates a second security policy associated with establishing the encrypted tunnel; and
terminating the encrypted tunnel between the server and the client device based at least in part on the second state of the client device violating the second security policy.

7. The computer-implemented method of claim 4, further comprising:
receiving, from the service and at the server, a request for the cryptographic identifier; and
sending the cryptographic identifier to the service.

8. The computer-implemented method of claim 4, wherein:
the cryptographic identifier comprises a first cryptographic identifier associated with authenticating the device identity of the client device;
verifying the at least one of the device identity or the user identity comprises verifying the device identity of the user device based at least in part on the first cryptographic identifier;
further comprising:
receiving, from the client device, a second cryptographic identifier associated with authenticating the user identity of the user via at least one of a universal authentication framework (UAF) authentication or a universal second factor (U2F) authentication; and
verifying, at least partly using the second cryptographic identifier, the user identity,
wherein establishing the encrypted tunnel between the client device and the server is based at least in part on verifying the device identity and the user identity.

9. The computer-implemented method of claim 8, further comprising:
determining that the service to which the client device is establishing the connection requires a multi-factor authentication; and
based at least in part on the service requiring the multi-factor authentication, sending a challenge to the client device to authenticate the user identity of the user.

10. The computer-implemented method of claim 4, wherein the security policy comprises a first security policy associated with using a first service, further comprising:
determining that the state of the client device violates a second security policy associated with a second service; and
refraining from generating a route between the server and the second service based at least in part on the state of the client device violating the second security policy.

11. The computer-implemented method of claim 4, wherein verifying the at least one of the device identity or the user identity is performed at least partly using a Web Authentication (WebAuthn) protocol.

12. The computer-implemented method of claim 4, wherein the posture data comprises first posture data indicating a first state of the client device, further comprising:
subsequent to receiving the first posture data, determining that second posture data indicating a second state of the client device was not received from the client device at a scheduled time;
based at least in part on not receiving the second posture data, terminating at least one of the route to the service, another route to another service, or the encrypted tunnel.

13. A system comprising:
one or more processors; and
one or more computer-readable media storing computer-executable instructions that, when executed by the one or more processors, cause the one or more processors to:

receive, from a client device, a request to establish an encrypted tunnel between the client device and a server managed by a cloud-based service provider;

receive, from the client device, a cryptographic identifier associated with authenticating at least one of a device identity of the client device or a user identity of a user of the client device;

verify, based at least in part on the cryptographic identifier, the at least one of the device identity or the user identity;

establish the encrypted tunnel between the client device and the server;

generate a route between the server and a service managed by the cloud-based service provider such that a connection is established between the client device and the service;

receive, from the service and at the server, a request for information associated with at least one of the client device or the user; and provide the information to the service.

14. The system of claim 13, comprising further instructions that, when executed by the one or more processors, cause the one or more processors to:

receive, from the client device, posture data that indicates a state of the client device;

determine that the state of the client device satisfies a security policy associated with using the service, wherein generating the route between the server and the service is performed based at least in part on the state of the client device satisfying the security policy.

15. The system of claim 14, wherein the posture data comprises first posture data indicating a first state of the client device, comprising further instructions that, when executed by the one or more processors, cause the one or more processors to:

receive, from the client device, second posture data indicating a second state of the client device;

determine that the second state of the client device violates the security policy; and terminate the route between the server and the service such that the connection between the client device and the service is terminated.

16. The system of claim 15, further comprising an agent executing on the client device, wherein the agent is configured to periodically provide the second posture data after a predetermined period of time from providing previous posture data.

17. The system of claim 13, comprising further instructions that, when executed by the one or more processors, cause the one or more processors to:

receive, from the client device, posture data that indicates a state of the client device;

determine that the state of the client device satisfies a security policy associated with establishing the encrypted tunnel, wherein establishing the encrypted tunnel between the client device and the server is performed based at least in part on the state of the client device satisfying the security policy.

18. The system of claim 17, wherein the posture data comprises first posture data indicating a first state of the client device, comprising further instructions that, when executed by the one or more processors, cause the one or more processors to:

receive, from the client device, second posture data indicating a second state of the client device;

determine that the second state of the client device violates the security policy; and terminate the encrypted tunnel between the client device and the server based at least in part on the second state of the client device violating the security policy.

19. The system of claim 13, comprising further instructions that, when executed by the one or more processors, cause the one or more processors to:

receive, from the service, a request for the cryptographic identifier; and provide the cryptographic identifier to the service.

20. The system of claim 13, wherein the cryptographic identifier is associated with authenticating the user identity of the user via at least one of a universal authentication framework (UAF) authentication or a universal second factor (U2F) authentication.

21. The system of claim 20, wherein verifying the user identity of the user is performed at least partly using a Web Authentication (WebAuthn) protocol.

* * * * *